United States Patent [19]

Tochihara

[11] Patent Number: 5,476,541
[45] Date of Patent: Dec. 19, 1995

[54] INK CONTAINING BLUE, RED OR YELLOW DYES, INK-JET RECORDING METHOD USING THE INK, AND RECORDING UNIT AND APPARATUS USING THE INK

[75] Inventor: Shinichi Tochihara, Hadano, Japan

[73] Assignee: Canon Kabushiki Kaisha, Tokyo, Japan

[21] Appl. No.: 116,752

[22] Filed: Sep. 7, 1993

[30] Foreign Application Priority Data

Sep. 21, 1992 [JP] Japan ................................... 4-251407

[51] Int. Cl.⁶ ............................................. C09D 11/02
[52] U.S. Cl. ................. 106/22 K; 106/22 R; 106/20 D
[58] Field of Search .............................. 106/22 K, 22 R, 106/20 D

[56] References Cited

U.S. PATENT DOCUMENTS

| | | | |
|---|---|---|---|
| 4,585,484 | 4/1986 | Haruta et al. | 106/22 |
| 4,661,158 | 4/1987 | Kobayashi et al. | 106/22 |
| 4,923,515 | 5/1990 | Koike et al. | 106/22 |
| 5,074,914 | 12/1991 | Shirota et al. | 106/22 |
| 5,078,790 | 1/1992 | Tochihara et al. | 106/20 |
| 5,080,716 | 1/1992 | Aoki et al. | 106/20 |
| 5,099,255 | 3/1992 | Koike et al. | 346/1.1 |
| 5,101,217 | 3/1992 | Iwata et al. | 346/1.1 |
| 5,125,969 | 6/1992 | Nishiwaki et al. | 106/22 |
| 5,131,949 | 7/1992 | Tochihara et al. | 106/20 |
| 5,132,700 | 7/1992 | Tochihara et al. | 346/1.1 |
| 5,135,571 | 8/1992 | Shirota et al. | 106/22 |
| 5,137,570 | 8/1992 | Nishiwaki et al. | 106/22 |
| 5,213,613 | 5/1993 | Nagashima et al. | 106/20 R |
| 5,256,194 | 10/1993 | Nishiwaki et al. | 106/22 K |
| 5,258,066 | 11/1993 | Kobayashi et al. | 106/22 R |

FOREIGN PATENT DOCUMENTS 59-78273  5/1984  Japan .

*Primary Examiner*—Helene Klemanski
*Attorney, Agent, or Firm*—Fitzpatrick, Cella, Harper & Scinto

[57] ABSTRACT

An ink containing dyes and a liquid medium for dissolving or dispersing the dyes, the dyes including a first dye selected from the group consisting of C. I. Direct Blue #199 and C. I. Acid Blue #9 and a second dye selected from the group consisting of C. I. Acid Red #52 and the compounds represented by general formula (1):

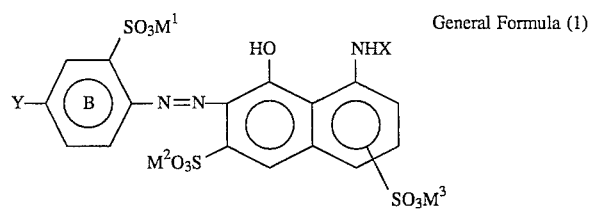

General Formula (1)

where Y is selected from the group consisting of a hydrogen atom, a methyl group, a methoxy group, an acetylamino group, and a nitro group, and Y may form a benzene ring together with the carbon atom at the 3 position of the benzene ring B; X is selected from the group consisting of an acetyl group, a benzoyl group, a p-toluenesulfonyl group, and 4-chloro-6-hydroxy-1,3,5-triazine-2-yl group; and M1, M2 and M3 are bases each selected from the group consisting of alkali metals and ammonium.

23 Claims, 7 Drawing Sheets

INK CONTAINING BLUE, RED OR YELLOW DYES, INK-JET RECORDING METHOD USING THE INK, AND RECORDING UNIT AND APPARATUS USING THE INK

BACKGROUND OF THE INVENTION

1. Field of the Invention

The present invention relates to a novel ink (a recording liquid) which hardly clogs an orifice of a recording head even when the head is left unused for a long time, and which, when used for recording on an uncoated paper sheet, such as, an ordinary type of paper widely used in offices, schools and the like, achieves a high-density recorded image, exhibits printing characteristics substantially stable regardless of the type of recording paper, and achieves red, green and blue mono-color printing with high consistency and reproducibility. The present invention further relates to an ink jet recording method using the ink and recording unit and apparatus using the ink.

2. Description of the Related Art

There have been proposed a wide variety of ink compositions for recording on recording media, for example, ink compositions for writing utensils, stamps, various recording meters and ink jet recording apparatus. These compositions are aqueous or organic solutions or dispersions of dyes.

Further, various ink jet recording methods have been proposed. In one method, electrically charged ink droplets are continuously produced, some of which are used for recording. In another method, a signal is inputted to a recording head having a piezoelectric element, and an ink droplet is produced in response to the signal. In still another method, thermal energy corresponding to a recording signal is applied to the ink contained in a chamber of a recording head, thereby producing an ink droplet.

Compared with inks for writing utensils, stamps and recording meters, the inks for such ink jet recording methods must achieve superior characteristics compatible with the features of the ink jet recording methods. For example, they must have very good ejection characteristics, such as low orifice-clogging characteristic, quick responsiveness to signals, and high suitability for high-speed recording, and very good recording characteristics, such as low bleeding characteristic, and high density printing.

Various yellow inks, magenta inks and cyan inks have been developed, and some of those inks have already been used for full-color recording.

However, red, green and blue inks highly suitable for ink jet recording have not been developed. Such inks would be useful particularly for a so-called mono-color recording method. By the mono-color recording method, printing can be made in a desired color simply by setting a cartridge containing an ink of the desired color in a recording apparatus, if such an ink is available. Such mono-color recording is increasingly needed for the purpose of, for example, printing business documents or personal post cards. In short, the need for red, green and blue inks highly suitable for ink jet recording are growing.

SUMMARY OF THE INVENTION

Accordingly, an object of the present invention is to provide an ink (a recording liquid) which hardly clogs an orifice of a recording head even when the head is left unused for a long time, and which, when used for recording on an uncoated paper sheet, such as, an ordinary type of paper widely used in offices, schools and the like, achieves a high-density recorded image, substantially prevents bleeding, exhibits printing characteristics substantially stable regardless of the types of recording paper, and facilitates red, green and blue mono-color printing, and to provide an ink jet recording method using the ink and a recording apparatus using the ink.

To achieve the above object, one aspect of the present invention provides an ink containing dyes and a liquid medium for dissolving or dispersing the dyes, the dyes including a first dye selected from the group consisting of C. I. Direct Blue #199 and C. I. Acid Blue #9 and a second dye selected from the group consisting of C. I. Acid Red #52 and the compounds represented by general formula (1):

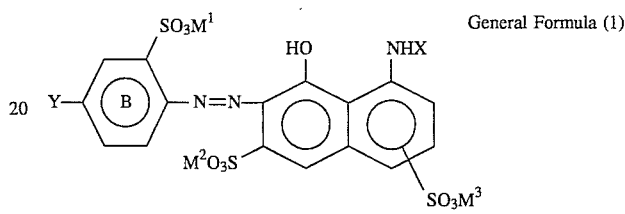

General Formula (1)

where Y is selected from the group consisting of a hydrogen atom, a methyl group, a methoxy group, an acetylamino group, and a nitro group, and Y may form a benzene ring together with the carbon atom at the 3 position of the benzene ring B; X is selected from the group consisting of an acetyl group, a benzoyl group, a p-toluenesulfonyl group, and 4-chloro-6-hydroxy-1,3,5-triazine- 2-yl group; and M1, M2 and M3 are bases each selected from the group consisting of alkali metals and ammonium.

Another aspect of the present invention provides an ink containing dyes and a liquid medium for dissolving or dispersing the dyes, the dyes including a third dye selected from the group consisting of C. I. Direct Yellow #86 and C. I. Acid Yellow #23 and a fourth dye selected from the group consisting of C. I. Acid Red #52 and the compounds represented by general formula (1).

Still another aspect of the present invention provides an ink containing dyes and a liquid medium for dissolving or dispersing the dyes, the dyes including a fifth dye selected from the group consisting of C. I. Direct Yellow #86 and C. I. Acid Yellow #23 and a sixth dye being C. I. Direct Blue #199 and C. I. Acid Blue #9.

Further objects, features and advantages of the present invention will become apparent from the following description of the preferred embodiments with reference to the attached drawings.

DETAILED DESCRIPTION OF THE PREFERRED EMBODIMENTS

Figure 1:
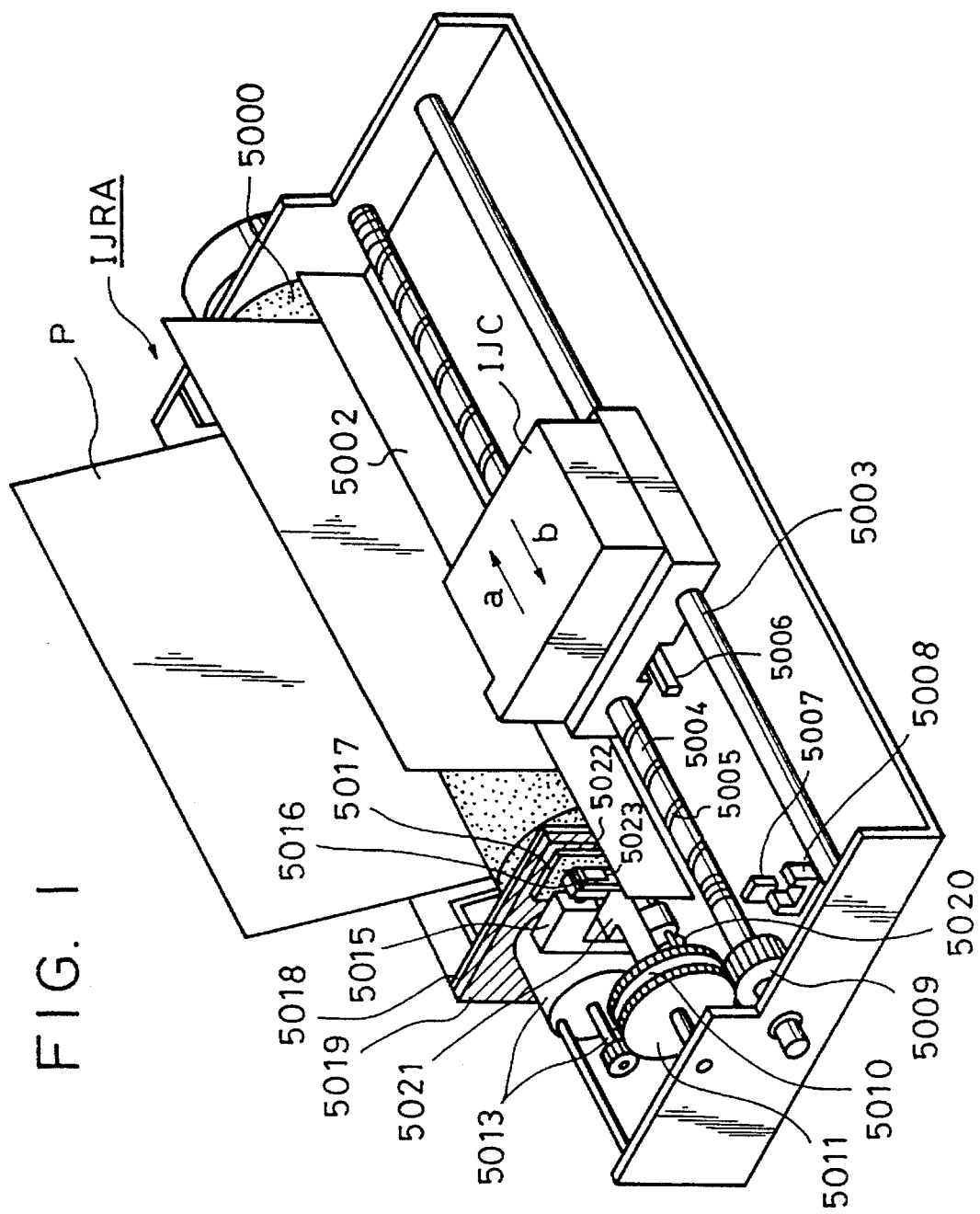
FIG. 1 illustrates an ink jet recording apparatus according to the present invention.

The preferred examples and embodiments of the present invention will be described in detail hereinafter.

Composition of Ink

The dye content of an ink must be as low as possible in order to prevent the ink from clogging an orifice even when the recording head is left unused for a long time. However, in general, a low dye concentration in an ink results in a rather vague record image with insufficient hue. According to the present invention, combinations of dyes have been found to achieve high-density and excellent color development in record images even though the concentrations of the dyes in an ink are quite low.

A preferred combination of dyes contained in a blue ink according to the present invention is a combination of a first dye selected from the group consisting of C. I. Direct Blue #199 and C. I. Acid Blue #9 and a second dye selected from the group consisting of C. I. Acid Red #52 and the compounds represented by general formula (1):

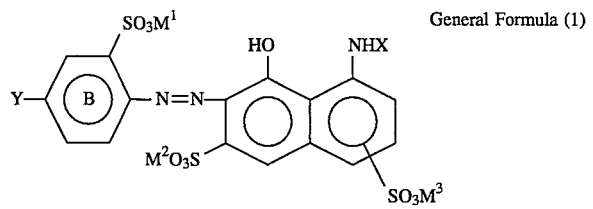

General Formula (1)

where Y is selected from the group consisting of a hydrogen atom, a methyl group, methoxy group, acetylamino group, and a nitro group, and Y may form a benzene ring together with the carbon atom at the 3 position of the benzene ring B; X is selected from the group consisting of an acetyl group, a benzoyl group, a p-toluenesulfonyl group, and 4-chloro-6-hydroxy-1,3,5-triazine-2-yl group; and M1, M2 and M3 are bases each selected from the group consisting of alkali metals and ammonium. Although examples of the compounds represented by general formula (1) are disclosed in Japanese Patent Application Laid-open No. 59-78273, the following examples are preferred according to the present invention:

Example Compound 1

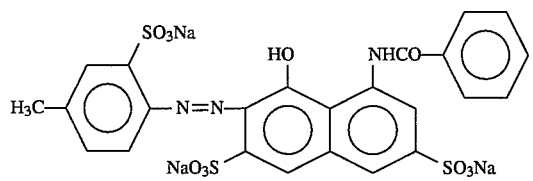

Example Compound 2

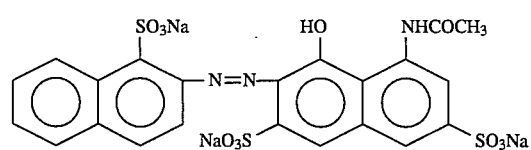

Example Compound 3

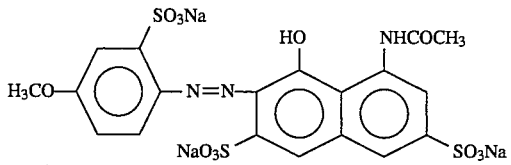

Example Compound 4

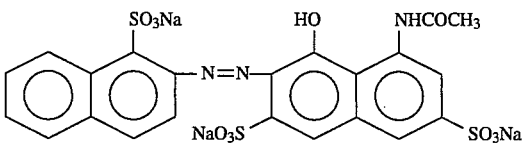

The suitable mixing ratio by weight of the first dye to the second dye is within a range of 5:1–2:1 and, more preferably, 5:1–3:1.

A preferred combination of dyes contained in a red ink according to the present invention is a combination of a third dye selected from the group consisting of C. I. Direct Yellow #86 and C. I. Acid Yellow #23 and a fourth dye selected from the group consisting of C. I. Acid Red #52 and the compounds represented by general formula (1). The suitable mixing ratio by weight of the third dye to the fourth dye is within a range of 1:5 to 1:1.5 and, more preferably, 1:4 to 1:2.

A preferred combination of dyes contained in a green ink according to the present invention is a combination of a fifth dye selected from the group consisting of C. I. Direct Yellow #86 and C. I. Acid Yellow #23 and a sixth dye selected from the group consisting of C. I. Direct Blue #199 and C. I. Acid Blue #9. The suitable mixing ratio by weight of the fifth dye to the sixth dye is within a range of 1:4 to 1:1.5 and, more preferably, 1:3 to 1:1.5.

These dyes are also suitable for an ink jet recording method in which thermal energy is applied to an ink so that an ink droplet is ejected from an orifice, because the dyes or decomposition products thereof are hardly deposited on the heater surface.

To achieve good color development and prevent orifice clogging even when the recording head is left unused for a long time, the concentrations of the dyes in an ink should preferably be 1 to 2.5% by weight of the total amount of the ink and, more preferably, 1.5 to 2.3% by weight.

Next, the liquid solvent ingredient used for the ink of the present invention will be described. To prevent orifice clogging, inks are generally prepared by using high-boiling-point solvents, such as polyhydric alcohols. However, because such widely-used solvents can have low surface tensions, a droplet thereof forms irregular bleeding when ejected onto an ordinary type of paper, thus degrading the quality of a recorded image. In short, it is difficult to achieve both the prevention of clogging and the production of an high-quality image.

On the other hand, polyhydric alcohols, such as glycerol and thioglycol, are suitable solvents to achieve both prevention of clogging and production of a high-quality image. Because they have high boiling points and high surface tensions, they facilitate the production of a high-quality image. Further, because glycerol and thioglycol have high hygroscopicity, even small amounts thereof substantially prevent clogging. The suitable concentration of these solvents in an ink are 1 to 20% by weight, more preferably, 1 to 15% by weight of the total amount of the ink. The combination of glycerol and thiodiglycol is preferable according to the present invention. Thiodiglycol is particularly preferable because it enhances (helps increase) the coloring density of the dyes and good ejection characteristic even after a long period of unuse.

To further enhance the clogging prevention, it is preferable to use urea or thiourea in addition to the combination of glycerol and thioglycol according to the present invention. Urea or thiourea, in cooperation with the glycerol, keeps the viscosity of the ink low and retains the fluidity of the ink even when all the water has evaporated from the ink, that is, when the ink contains only glycerol, dyes and urea or thiourea. Therefore, if urea or thiourea is contained in an ink, the polyhydric alcohol content can be reduced to a low level relative to the dye content, thus enhancing the printing quality and fixability (a drying characteristic of a recorded image) of the ink. The suitable concentration of urea or thiourea in an ink is 0.5 to 15% by weight and, more preferably, 2 to 10% by weight.

However, the fixability cannot be enhanced by the ink based on the above-described combination of dyes, glycol and/or thiodiglycol, and water. To enhance the fixability, an ink according to the present invention contains an aliphatic monoalcohol. Though the use of a penetrant, such as a surfactant, has been proposed to enhance the fixability, it reduces the quality of an image recorded on an ordinary type of paper. More specifically, a penetrant causes irregular blur on an ordinary type of paper. On the other hand, an aliphatic monoalcohol causes uniform blur, and enhances the penetrability of an ink droplet into paper and the evaporativity of an ink droplet, thus achieving high quality and quick fixation of a recorded image. Preferred aliphatic monoalcohols are ethyl alcohol, isopropyl alcohol and n-butyl alcohol. Isopropyl alcohol is particularly preferred because it has less odor than the others, as well as advantages in enhancing the fixability and achieving a high-quality image. The suitable concentration of an aliphatic monoalcohol in the ink is 0.1 to 10% by weight and, more preferably, 1 to 5% by weight.

The suitable water content in the ink is 60 to 90% by weight and, more preferably, 70 to 90% by weight.

In addition to the above-mentioned ingredients, the ink of the present invention may contain a variety of additives, such as a viscosity adjusting agent, a surface tension adjusting agent, a pH adjusting agent, an antifungal agent, and a rust preventative agent, according to what may be needed.

The pH value of the ink of the present invention is determined based on the effects on members that contact the ink, the storing stability of the ink, the solubility of the dyes, etc. Particularly in a recording method which applies thermal energy to the ink contained in the recording head to produce an ink droplet, because the dissolution stability of dyes is closely related to sequential ejection stability of the recording head, an optimal pH of the ink must be achieved so as to most stably dissolve the dye. The suitable pH of the ink of the present invention is pH 7.5 to 11 and, more preferably, pH 8.5 to 10.5.

The use of the above-described ink of the present invention in an ink jet recording method achieves good recording. Unlike the conventional ink, the ink of the present invention achieves good fixability of the recorded images, and high-density and high-quality images regardless of the types of paper.

Although the ink of the present invention is very suitable for the below-described ink jet recording method which uses thermal energy to produce ink droplets, it is also applicable to other ink jet recording methods and ordinary writing utensils.

EXAMPLES

Examples of the ink of the present invention will be described in detail hereinafter.

Examples 1 and 2

The following ink compositions were thoroughly stirred, and pressure-filtered through a Fluoropore Filter™ having a pore size of 0.22 µ (Sumitomo Electric industries, Ltd.) to obtain green inks according to the present invention. Hereinafter, "part" and "parts" mean a part and parts by weight with respect to 100 parts of the ink.

| Ink 1 | |
| --- | --- |
| C. I. Direct Blue #199 | 1.3 parts |
| C. I. Direct Yellow #86 | 0.7 part |
| Glycerol | 5.1 parts |
| Thiodiglycol | 4.9 parts |
| Urea | 5.0 parts |
| Isopropyl Alcohol | 4.1 parts |
| Deionized Water | balance |
| Total | 100 parts |
| Ink 2 | |
| C. I. Acid Blue #9 | 1.4 parts |
| C. I. Direct Yellow #86 | 0.6 part |
| Glycerol | 5.2 parts |
| Thiodiglycol | 5.0 parts |
| Urea | 5.2 parts |
| Isopropyl Alcohol | 3.8 parts |
| Deionized Water | balance |
| Total | 100 parts |

Figure 2:
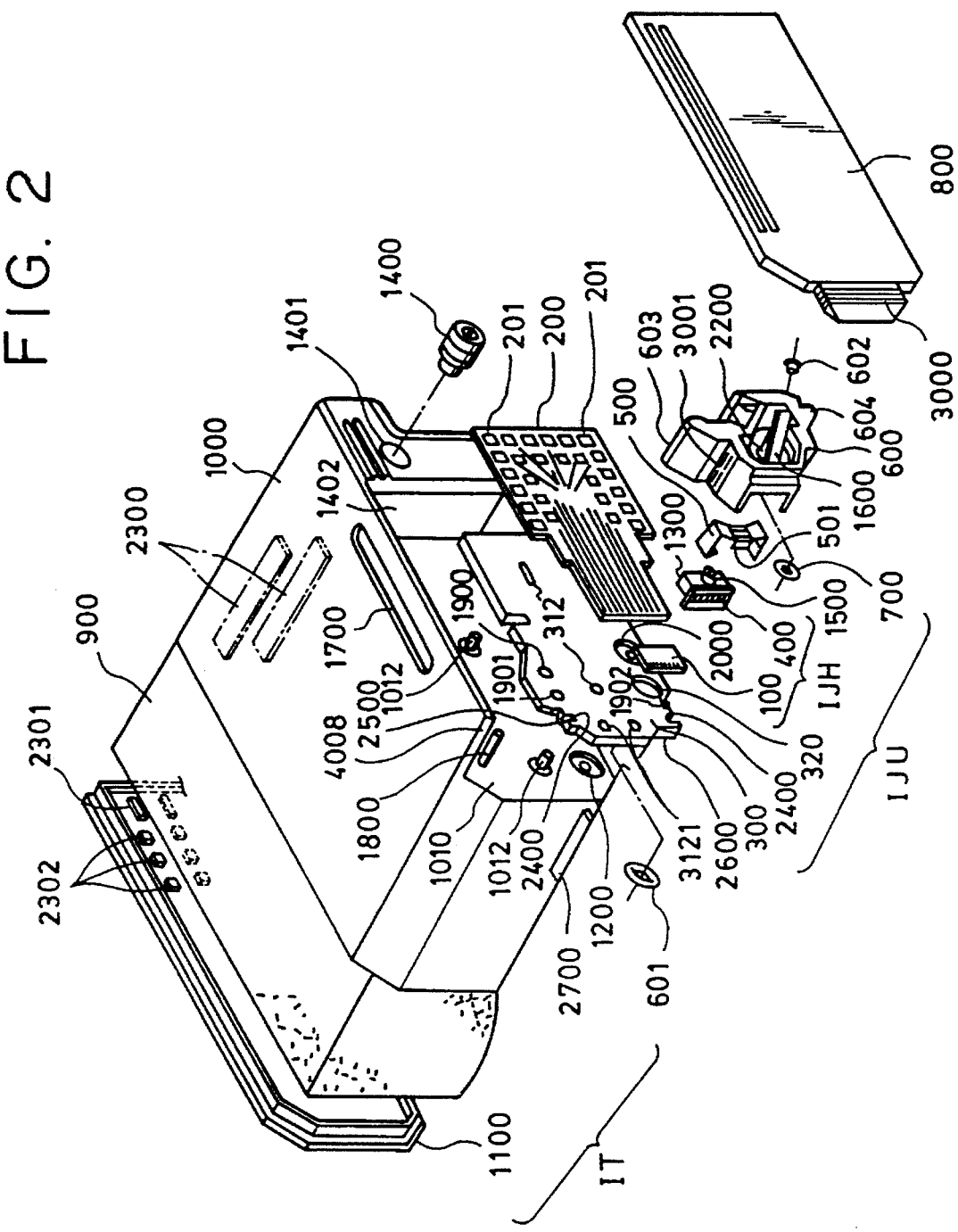
FIG. 2 is an exploded perspective view of an ink jet cartridge.

These inks were charged in ink retainers (made of polyurethane in these examples) of recording units, as described below with reference to FIG. 2, according to the ink jet recording method which applies thermal energy to the ink to eject ink droplets from the orifices, and the recording units were separately set in an ink jet recording apparatus as shown in FIG. 1. The apparatus performed printing on ordinary types of paper, 4024DP (Xerox) and NP Dry SK (Canon). The images printed in each ink on each type of paper were clear green images of high density with substantially no blur. The fixability of both inks were good, and they caused no deposition of dye decomposition on the heater surface. The recording units, as shown in FIG. 2, which were filled with the respective inks were allowed to stand for a month before printing was performed again. No orifice clogging occurred during that period. Further, these inks excellently matched the polyurethane which formed the ink absorbers.

Examples 3 and 4

The following ink compositions were prepared generally in the same manner as in Examples 1 and 2 to obtain red inks according to the present invention.

| Ink 3 | |
| --- | --- |
| Example Compound 1 | 1.4 parts |

-continued

| | |
|---|---|
| C. I. Direct Yellow #86 | 0.6 part |
| Glycerol | 4.9 parts |
| Thiodiglycol | 5.1 parts |
| Urea | 5.0 parts |
| Isopropyl Alcohol | 4.0 parts |
| Deionized Water | balance |
| Total | 100 parts |

Ink 4

| | |
|---|---|
| C. I. Acid Red #52 | 1.5 parts |
| C. I. Acid Yellow #23 | 0.5 part |
| Glycerol | 5.0 parts |
| Thiodiglycol | 5.2 parts |
| Urea | 5.1 parts |
| Isopropyl Alcohol | 3.8 parts |
| Deionized Water | balance |
| Total | 100 parts |

The printing characteristics and ejection characteristics of these inks were evaluated in generally the same manner as in Examples 1 and 2. The characteristics of these inks in Examples 3 and 4 were as good as those in Examples 1 and 2.

Examples 5 and 6

The following ink compositions were prepared in generally the same manner as in Examples 1 and 2 to obtain blue inks according to the present invention.

Ink 5

| | |
|---|---|
| C. I. Direct Blue #199 | 1.6 parts |
| Example Compound 1 | 0.4 part |
| Glycerol | 4.9 parts |
| Thiodiglycol | 5.1 parts |
| Urea | 5.0 parts |
| Isopropyl Alcohol | 4.0 parts |
| Deionized Water | balance |
| Total | 100 parts |

Ink 6

| | |
|---|---|
| C. I. Acid Blue #9 | 1.5 parts |
| C. I. Acid Red #52 | 0.5 part |
| Glycerol | 5.0 parts |
| Thiodiglycol | 5.2 parts |
| Urea | 5.1 parts |
| Isopropyl Alcohol | 3.8 parts |
| Deionized Water | balance |
| Total | 100 parts |

The printing characteristics and ejection characteristics of these inks were evaluated in generally the same manner as in Examples 1 and 2. The characteristics of these inks in Examples 5 and 6 were as good as those in Examples 1 and 2.

As described above, the ink of the present invention has the following advantages:

(1) Orifice clogging is substantially prevented even after the recording head is left unused for a long time.

(2) A high-density image can be produced despite the low dye content.

(3) Images of red, green and blue colors can be produced with high consistency and reproducibility regardless of the types of ordinary paper.

(4) Blur of a printed image can be substantially prevented even on an ordinary type of paper.

Thus, the ink of the present invention is particularly suitable for the ink jet recording method which uses thermal energy to eject ink droplets from orifices.

Next, an embodiment of the ink jet recording apparatus of the present invention will be described with reference to the attached drawings.

FIGS. 1 to 5 illustrate an ink jet recording apparatus IJRA, an ink jet unit IJU, an ink jet head IJH, an ink tank IT for containing an ink, and an ink jet cartridge IJC for recording according to the present invention and the relations among these components and the apparatus. The construction of the components will be described hereinafter.

Ink jet Recording Apparatus

Referring to FIG. 1, an ink jet recording apparatus IJRA according to the present invention comprises: a driving motor 5013 connected to transmission gears 5011, 5009; a lead screw 5005 connected to the transmission gears 5011, 5009 so as to be rotatable forward and backward in accordance with the operation of the driving motor 5013; a carriage HC having a pin (not shown) engaged with an helical groove 5004 formed on the lead screw 5005. Thus, the carriage HC is reciprocated in the directions indicated by the arrows a and b in accordance with the operation of the driving motor 5013. An ink jet cartridge IJC is mounted on the carriage HC. A paper pressing plate 5002 presses a recording sheet P onto a platen 5000. Photocouplers 5007, 5008 detect a lever 5006 connected to the carriage HC when the lever 5006 is in the vicinity of the photocouplers 5007, 5008. The photocouplers 5007, 5008 and the lever 5006 constitute home position detecting means for switching the rotational direction of the driving motor 5013. A cap 5022 for capping a front surface of a recording head is supported by a supporting member 5016. Suction means 5015 is connected to the cap 5022, and recovers the recording head by suction through an opening 5023 of the cap 5022. A cleaning blade 5017 is movable back and forth by means of a member 5019. The cleaning blade 5017 and the member 5019 are supported by a supporting plate 5018 connected to the main body of the apparatus. The cleaning blade 5017 may be of another type, such as a known cleaning blade.

As shown in FIG. 2, an ink jet cartridge IJC according to this embodiment of the ink jet recording apparatus of the present invention comprises a relatively large ink tank IT and an ink jet unit IJU slightly protruding from a plane of the front surface of the ink tank IT. The ink jet cartridge IJC is detachably fastened to a carriage HC of an ink jet recording apparatus IJRA (as shown in FIG. 1) by positioning means and electric contacts as described later.

Construction of Ink jet Unit IJU

The ink jet unit IJU according to this embodiment performs recording by using an electrothermal converter for generating, in response to an electric signal, thermal energy to cause membrane boiling in the ink.

Referring to FIG. 2, a heater board 100 comprises a Si substrate; a plurality of electrothermal converters arranged in a row; and connecting lines made of, for example, Al, for supplying electricity to the electrothermal converters. The electrothermal converters and the connecting lines have been formed on the Si substrate by a film forming technique. A connecting line board 200 comprises connecting lines corresponding to the connecting lines of the heater board 100 (connected by, for example, wire bonding); and pads 201 which are disposed at the ends of the connecting lines and receive electric signals from the recording apparatus.

A grooved top plate 1300 has a liquid chamber, walls separating ink passages, and the like. The grooved top plate 1300 is monolithically molded together with an ink inlet 1500 for introducing the ink from the ink tank IT into the liquid chamber, and an orifice plate 400 having a plurality of ejection orifices. This molding is formed preferably of a polysulfone, but may also be formed of another molding resin.

A supporter 300 is formed of, for example, a metal, so as to have a flat surface on which the connecting line board 200 is supported. The connecting line board 200 is fixed to the supporter 300 by using, for example, an adhesive. The supporter 300 serves as a bottom plate of the ink jet unit IJU.

A fastening spring 500 for fastening the top plate 1300 and the heater board 100 together to the supporter 300 is formed in substantially the shape of a letter "M", and has an apron 501 formed at a middle portion. The leg portions of the "M"-shaped fastening spring 500, holding the top plate 1300 and the heater board 100 therebetween, are put into holes 3121 formed in the supporter 300 until the ends of the leg portions hook on the other side of the supporter 300, thus fastening the top plate 1300 and the heater board 100 to the supporter 300 by the elastic restoration force of the spring 500. More specifically, a middle portion of the "M"-shaped spring 500 presses the liquid chamber of the grooved top plate 1300, and the linear edge of the apron 501 presses a portion of the liquid passages of the top plate 1300.

Figure 3:
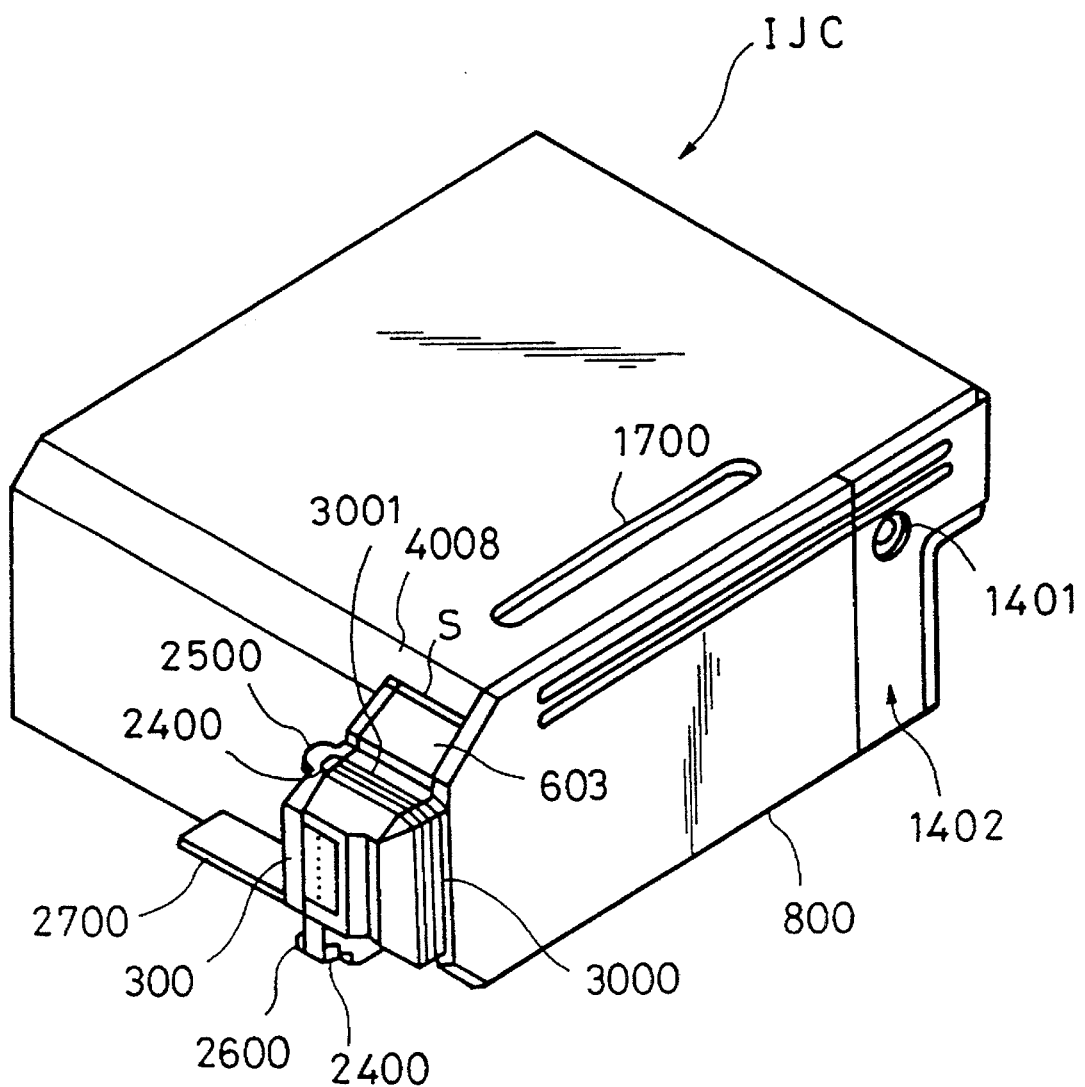
FIG. 3 is a perspective view of the ink jet cartridge shown in FIG. 2.

The supporter 300 has two positioning holes 312 and other positioning holes 1900 and 2000 for receiving projections formed on the ink tank IT, that is, two positioning projections 1012 and other positioning projections 1800 and 1801 for thermal fusing, respectively. The supporter 300 further has projections 2500 and 2600 protruding toward the ink tank IT. These projections 2500, 2600 are used for positioning the ink jet cartridge IJC to a carriage HC of a recording apparatus IJRA. The supporter 300 has a hole 320 for receiving an ink supplying pipe 2200 (described later) for supplying the ink from the ink tank IT to the top plate 1300, etc. The supporter 300 has recesses 2400, 2400 formed respectively adjacent to the positioning projections 2500, 2600. As shown in FIG. 3, when the ink jet cartridge IJC is assembled, the recesses 2400, 2400 and the positioning projections 2500, 2600 are positioned adjacent to a tip portion of the head having parallel grooves 3000 and 3001 formed on three sides thereof. In this construction, the recesses 2400 prevent undesired substances, such as ink or dust, from reaching the positioning projections 2500, 2600.

A cover 800 having the parallel grooves 3000 forms an outer wall of the ink jet cartridge IJC and provides a space for containing the ink jet unit IJU.

An ink supplier 600 having the parallel grooves 3001 on its surfaces is provided with an ink guide pipe 1600 cantilevered, that is, connected at one end thereof to the ink supplying pipe 2200. A sealing pin 602 is inserted into the ink supplier 600 in order to unfailingly achieve capillarity between the ink guide pipe 1600 and the ink supplying pipe. The ink supplier 600 is further provided with a packing 601 for sealing the connection between the ink supplying pipe 220 and the ink tank IT. A filter 700 is provided at the end of the ink supplying pipe 2200, the end closer to the ink tank IT.

Because this ink supplier 600 is formed by molding, the production cost is low, and high dimensional precision is achieved by eliminating dimensional errors caused by the production process. Further, because the ink guide pipe 1600 is cantilevered, desirable abutting between an ink guide pipe 1600 and an ink inlet 1500 can be constantly achieved even by a mass production process. According to this embodiment, complete connection between the ink guide pipe 1600 and the ink inlet 1500 is unfailingly achieved simply by pouring an adhesive from the ink supplier 600 to the abutting portions.

The ink supplier 600 is fastened to the supporter 300 simply by inserting pins (not shown) formed on the ink supplier 600 into holes 1901, 1902 formed in the supporter 300 and then thermally fusing portions of the pins protruding from the supporter 300. Although, as a result of the thermal fusion, slightly raised areas are formed on the side of supporter 300 facing the ink tank IT, the raised areas are received by recesses (not shown) formed on the counter surface (the ink jet unit IJU-mounting surface) of the ink tank IT, thereby causing no adverse affect on precise positioning of the ink jet unit IJU to the ink tank IT.

Construction of Ink Tank IT

The ink tank IT comprises: a cartridge main body 1000; an ink retainer 900 contained in a portion of the main body 1000 remote from the ink jet unit IJU-mounting surface; and a cover 1100 for enclosing the ink retainer 900 in the main body 1000. The ink retainer 900, made of an ink-absorbing material, is impregnated with an ink. The cartridge main body 1000 has an ink supplying opening 1200 for supplying the ink to the ink jet unit IJU. The ink supplying opening 1200 is also used to inject an ink into the main body 1000 to impregnate the ink retainer 900, before the ink jet unit IJU is mounted on a designated portion 1010 of the cartridge main body 1000.

Ink can be injected into the cartridge main body 1000 through an air hole 1401, as well as the ink supplying opening 1200. However, according to this embodiment, it is much preferred that the ink supplying opening 1200 be used for ink injection because of the following construction, which is highly effective in practice. To facilitate smooth ink injection into the cartridge main body 1000 and smooth ink supply out of the main body 1000, the air hole 1401, which allows air to flow from the inside to the outside of the ink tank IT and vice versa, is provided in a portion in the corner farthest from the ink supplying opening 1200, and ribs 2300 and partial ribs 2301 and 2302 for forming air passages or regions are provided on the main body 1000 and the cover 1100, respectively, in portions which are near the edges or corners of the main body 1000 and the cover 1100 and as far from the ink supplying opening 1200 as possible. Thereby, the air passage or region formed along the partial ribs 2302, 2301 and the ribs 2300 to the air hole 1401 extends along corner portions as far from the ink supplying opening 1200 as possible.

The construction and function of the ribs 2300 and the partial ribs 2301, 2302 will be more specifically described. Four ribs 2300 are provided in the ink tank main body 1000, in a portion remote from the ink supplying opening 1200, extending parallel to the reciprocation course of the carriage HC. The four ribs 2300 keep the ink retainer 900 apart from the rear wall of the ink tank IT, that is, the wall remote from the ink supplying opening 1200. The partial ribs 2301, 2302 are provided on the inside surface of the cover 1100, at positions corresponding to the four ribs 2300. Because, unlike the ribs 2300, the partial ribs 2301, 2302 are divided and arranged in an area at most half the entire area of the inside surface of the cover 1100, the partial ribs 2301, 2302 can form a larger air region or passage than the main ribs 2300. The ribs 2300 and partial ribs 2301, 2302 stabilize the ink retained in a corner portion of the ink retainer 900 farthest from the ink supplying opening 1200, that is, a corner portion closest to these ribs, and enables the ink retained therein to unfailingly flow toward the ink supplying opening 1200 by capillarity.

The air hole 1400 for allowing air to flow between the inside and the outside of the ink tank IT has an liquid-repelling member 1401 fitted therein, thereby preventing the ink leaking through the air hole 1400.

The above arrangement of the ribs are highly effective if the ink containing space of the ink tank IT has generally the shape of a rectangular parallelepiped with its longer sides being substantially perpendicular to the carriage reciprocation. If the longer sides of the ink containing space are parallel to the carriage reciprocation or if the shape thereof is generally a cubic, the partial ribs are preferably provided on the entire inside surface of the cover 1100 to achieve stable ink supply from the ink retainer 900.

Figure 4:
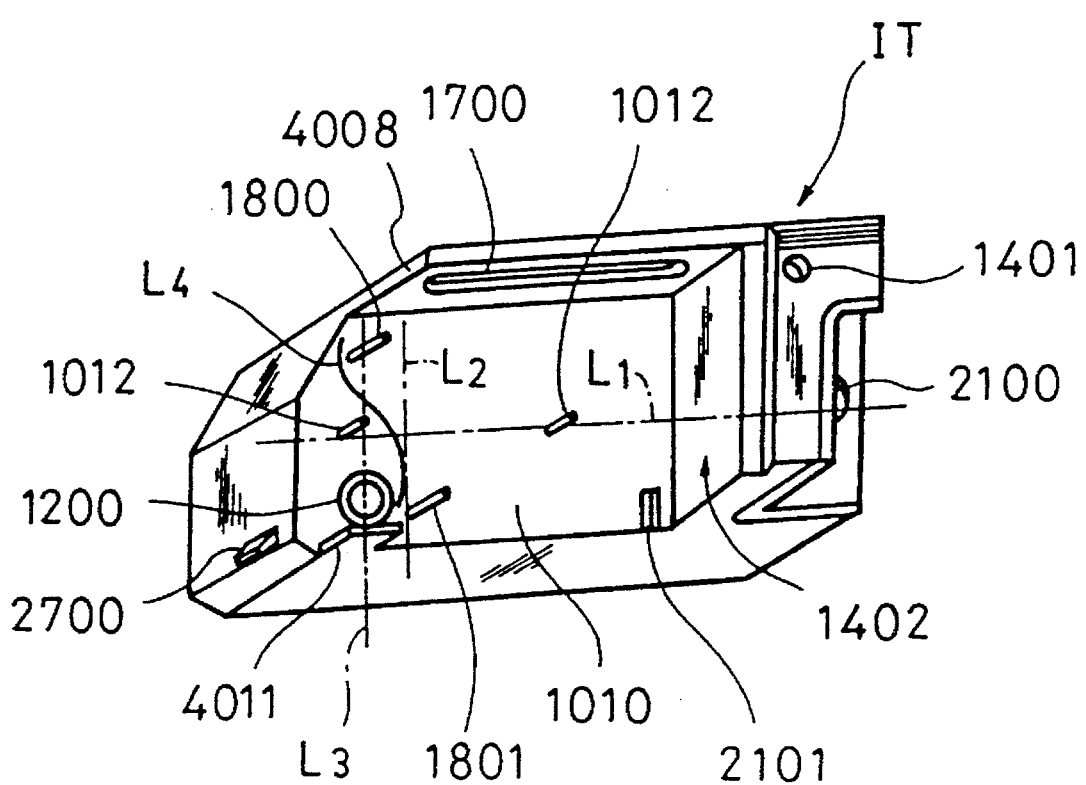
FIG. 4 illustrates in detail a portion of the ink jet cartridge.

FIG. 4 illustrates the construction of the ink jet unit IJU-mounting surface of the ink tank IT.

As shown in FIG. 4, the two projections 1012 for positioning the supporter 300 by fitting into the two positioning holes 312 of the supporter 300 are disposed on a straight line L1 which substantially passes the center of an orifice opening portion of the orifice plate 400 and is parallel to the bottom surface of the ink tank IT or a mounting reference plane lying on the surface of a carriage HC. The height of the projections 1012 is slightly less than the thickness of the supporter 300.

Provided on the extension of the line L is a hold 2100 for engaging with a rectangular engaging surface 4002 of a positioning hook 4001 (shown in FIG. 4) provided on the carriage HC. Thereby, the force for positioning the ink tank IT to the carriage HC acts on a plane which includes the line L1 and is parallel to the above-mentioned reference plane.

The above-described arrangement is advantageous because, in this arrangement, the positioning precision of the orifices of the head can be substantially determined by the positioning precision of the ink tank IT alone, as will be described in detail with reference to FIG. 4.

The projections 1800, 1801 corresponding to the fastening holes 1900, 2000 of the supporter 300 are longer than the projections 1012. When the projections 1800, 1801 are inserted into the holes 1900, 2000, the portions thereof protruding from the holes are thermally fused, thereby fastening the supporter 300 to the ink jet unit IJU-mounting surface. Because the center of the ink supplying opening 1200 is substantially on a line L3 which is perpendicular to the line L1 and intersects the projection 1800, and because it is apart from a line L2 which is perpendicular to the line L1 and intersects the projection 1801. The connection of the ink supplying opening 1200 to the ink supplying pipe 2200 is stabilized, thereby the load which is imposed on the connection in the case of fall or other impact. Further, because the projection 1800, 1801 are disposed on the lines L2 and L3 apart from each other and are disposed around the projection 1012 closer to the ejection orifices of the head IJH, they enhance the positioning precision of the head IJH to the ink tank IT. A curved line L4 indicates the position of the outer wall of the ink supplier 600 when the ink supplier 600 is mounted. Because the projections 1800, 1801 are along the curved line 600, they provide sufficiently large strength and precise positioning. A front tip 2700 of the ink tank IT is inserted into a hole formed in a front plate 4000 of the carriage HC in order to prevent a abnormally large positional deviation of the ink tank IT. An engaging portion 2101 engages with a further positioning portion of the carriage HC.

Because the ink jet unit IJU is attached to the ink tank IT and then covered with the cover 800, the ink jet unit IJU is surrounded by walls except the underneath opening. When the ink jet cartridge IJC is mounted on the carriage HG, the underneath opening is substantially closed by the carriage HC, thus containing the ink jet unit IJU in a substantially closed space. This substantially closed space is useful for keeping the heat generated from the head IJH so as to maintain the IJH in a desirably high temperature range. However, after a long-hour continuous use, the temperature inside this closed space may rise too high. In this embodiment, to promote heat release from the supporter (made of a metal), a slit 1700 having a width smaller than the width of this space is formed in the top wall of the ink jet cartridge IJC. Thereby, this embodiment prevents an excessive temperature rise in the ink jet unit IJU while maintaining a uniform temperature distribution over the entire ink jet unit IJU regardless of changes in the environment.

When the ink jet cartridge IJC is assembled, the ink is supplied into the ink supplier 600 via the hole 320 of the supporter 300, and an inlet of the supplier 600. Then, the ink flows out of an outlet of the supplier 600 into the liquid chamber of the top plate 400, via the corresponding supplying pipe and the ink inlet 1500 of the top plate 1300. The connecting portions of such ink supplying passage are sealed by packings made of, for example, silicon rubber or butyl rubber.

In this embodiment, the top plate 1300 has been monolithically formed together with the orifice plate 400 in the same molds by using a resin highly resistive to ink, such as polysulfone, polyethersulfone, polyphenylene oxide, or polypropylene.

Because the ink supplier 600, the top plate-orifice plate composite, and the cartridge main body 1000 are monolithic moldings, the assembly precision and the product quality can be enhanced even in mass production. Further, because the number of component parts is accordingly reduced, the expected excellent characteristics of the product can be unfailingly achieved.

The ink retainer of this embodiment is made of polyurethane.

Mounting of Ink jet Cartridge IJC on Carriage HC

Figure 5:
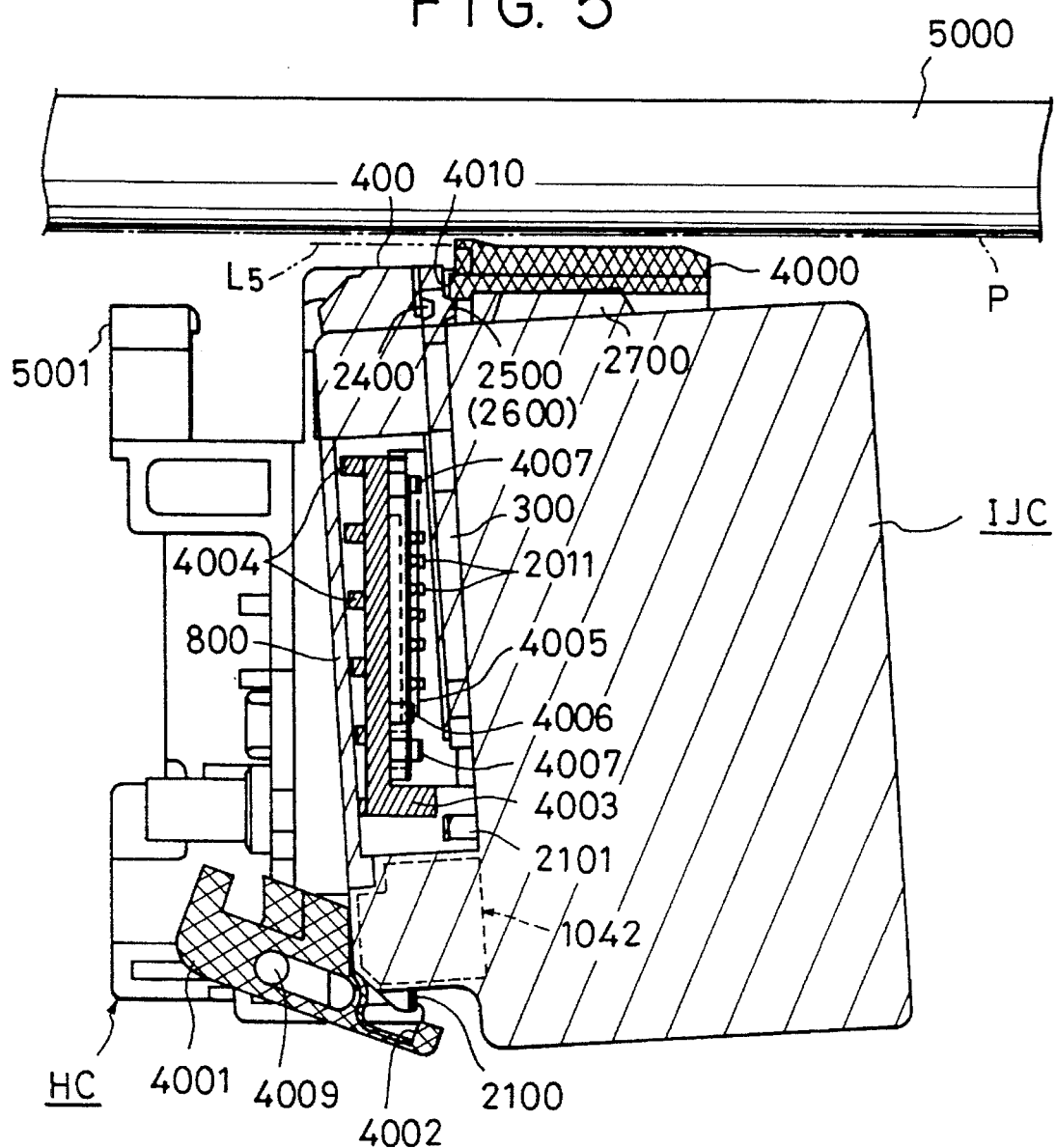
FIG. 5 illustrates how the ink jet cartridge is connected to a carriage.

Referring to FIG. 5, a platen roller 5000 guides a recording medium P upwards perpendicularly to the sheet of the drawing. The carriage HC is moved along the platen roller 5000. The carriage HC comprises the above-mentioned front plate 4000 (having a thickness of 2 mm) disposed between the platen roller 5000 and the ink jet cartridge IJC mounted thereon; a flexible sheet 4005 having pads 2011 corresponding to the pads 201 provided on the connecting line board 200 of the ink jet cartridge IJC; an electric contact supporting plate 4003 which supports rubber pads 4006 for providing elastic force by which the pads 201 and the pads 2011 are pressed onto each other; and the above-mentioned positioning hook 4001 for fixing the ink jet cartridge IJC to the recording position.

The front plate 4000 has two positioning raised surfaces 4010 corresponding to the positioning projections 2500, 2600 of the supporter 300 of the ink jet cartridge IJC. When the ink jet cartridge IJC is attached to the carriage HC, the raised surfaces 4010 receive force acting perpendicularly to the surfaces 4010. Therefore, to enhance the strength of the front plate 4000, a plurality of reinforcement ribs (not shown) parallel to the direction of the force are formed on the side thereof closer to the platen roller 5000. The ribs have head protecting projections which are projected a little (about 0.1 mm) toward the platen roller 5000 from the position of the front surface of the ink jet cartridge IJC mounted on the carriage HC.

The electric contact supporting plate 4003 has a plurality of reinforcement ribs 4004 extending perpendicularly to the reinforcement ribs formed on the front plate 4000. The heights of the reinforcement ribs 4004 from the base surface of the electric contact supporting plate 4003 are gradually reduced from the platen roller-side toward the hook-side. By this construction, the ink jet cartridge IJC is not perpendicular but slightly angled to the platen roller 5000 when attached to the carriage HC, as shown in FIG. 5. The supporting plate 4003 further has positioning raised surfaces 4007 and 4008 formed at the hook-side and the platen roller-side, respectively, in order to achieve stable electric contacts. These raised surfaces 4007, 4008 form a pad contacting area therebetween and exclusively determines the amount of deformation of a rubber sheet 4006 having studs corresponding to the pads 2011. When the ink jet cartridge C is fixed in the recording position, the positioning raised surfaces 4007, 4008 abut the surface of the connecting line board 300. Further, in this embodiment, the pads 201 of the connecting line board 300 are arranged symmetrically about the line L1 so as to uniform the amounts of deformation of the studs of the rubber sheet 4006, thereby achieving substantially the same abutting pressures between the pads 2011 and the pads 201.

The hook 4001 has a long hole engaged with a fixing shaft 4009. This long hole facilitates the movements of the hook 4001 for positioning the ink jet cartridge IJC to the carriage HC, that is, a counterclockwise turn from the position as shown in FIG. 5, and then a sliding movement to the left substantially parallel to the platen roller 5000. The hook 4001 may be thus moved by any means and, preferably, by lever means or the like.

Positioning of the ink jet cartridge IJC to the carriage HC is completed as follows. By the counterclockwise turn of the hook 4001, the ink jet cartridge IJC is moved toward the platen roller 5000 until the positioning projections 2500, 2600 reach such a position that the projections 2500, 2600 will abut the positioning raised surface 4010 of the front plate 4000 by the following leftward movement of the hook 4001. When the hook 4001 is moved toward the left, the rectangular engaging surface 4002 of the hook 4000 abuts the hold 2100 and thus pulls the ink jet cartridge IJC so as to horizontally turn the ink jet cartridge IJC about a contact area between the positioning projections 2500, 2600 and the positioning raised surfaced 4010, thereby bringing the pads 201 into contact with the pads 2011. When the hook 4001 is held in a predetermined position, that is, a fixing position, the positioning of the ink jet cartridge IJC to the carriage HC is completed, achieving complete contacts between the pads 201 and the pads 2011, complete surface contacts between the positioning projections 2500, 2600 and the positioning raised surface 4010, surface contact between the rectangular engaging surface 4002 and the rectangular surface of the hold 2100, and surface contact between the connecting line board 300 and the positioning surfaces 4007, 4008.

Next described will be an embodiment of the ink jet recording apparatus of the present invention comprising the above-described components.

Figure 6:
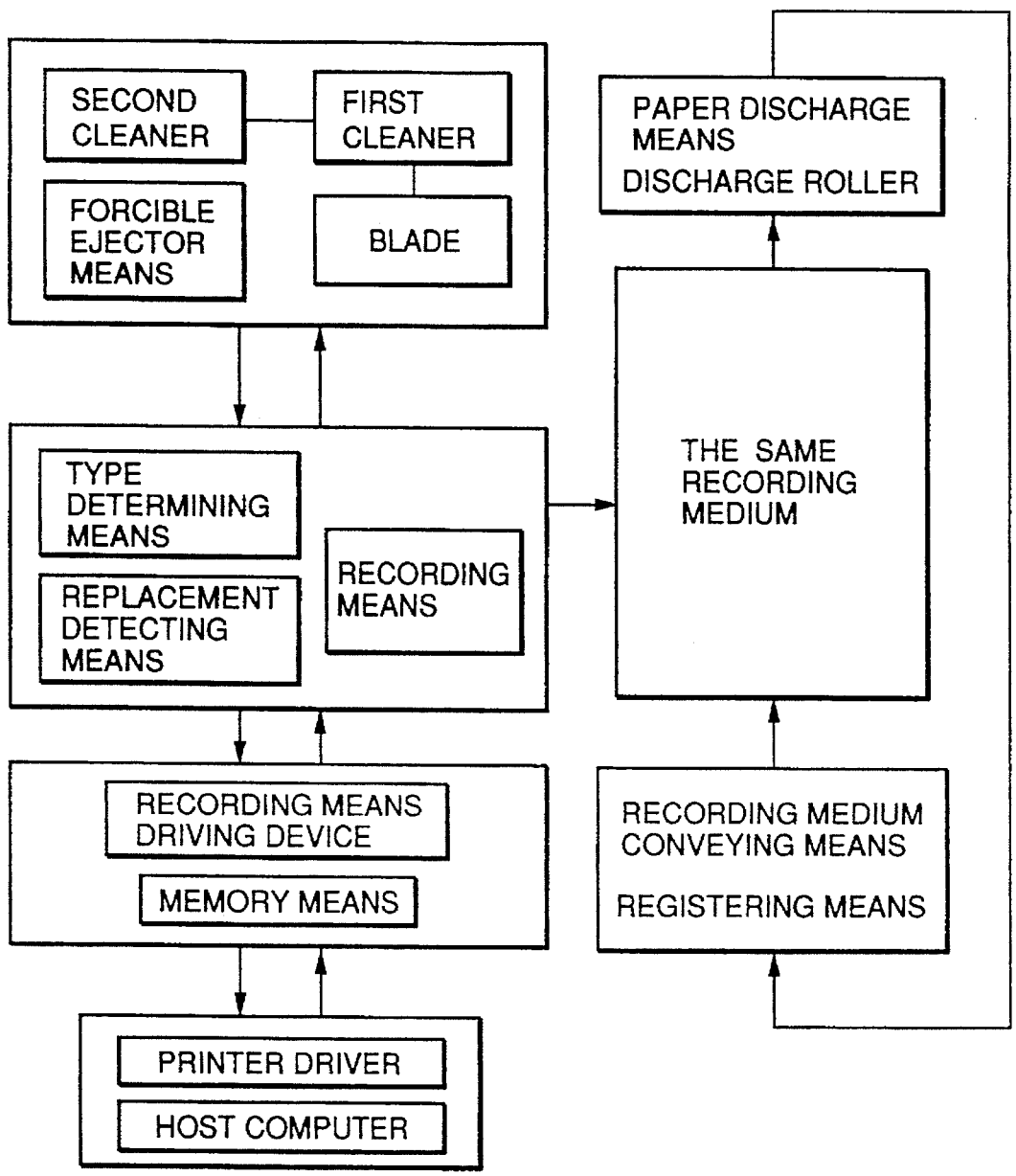
FIG. 6 illustrates the system of the ink jet recording apparatus of the present invention.

FIG. 6 is a block diagram of the ink jet recording apparatus of the present invention. The apparatus comprises an ink jet cartridge IJC unit including recording means and, preferably, type determining means and replacement detecting means; a cleaning unit including a blade for performing maintenance of the head or the like when the IJC unit is at the home position, a blade cleaner (a first cleaner) for cleaning the blade, an ink receiving member (a second cleaner) for receiving ink ejected from the recording means to maintain stable recording, and a forcible ejector means for forcibly ejecting the ink through the nozzle of the recording means; a control unit including a recording means driving device for outputting recording signals to the recording means, and memory means, such as a line buffer memory for supplying printing patterns to the recording means deriving device; and a host unit including a printer driver for converting printing patterns from a host computer or the like into a form suitable for the control unit. Further, the apparatus comprises recording medium conveying means for conveying a recording medium so that an image is recorded on the recording medium by the recording means; and, preferably, a registering means for registering a recording medium, thereby ensuring that when a single recording medium is repeatedly conveyed by the recording medium conveying means for mono-color multi-process recording, the recording medium is registered at the same position and posture for each recording process. The recording apparatus further comprises paper discharge means for discharging a recording medium out of the apparatus after recording. Various known types of paper discharge means can be employed according to the present invention. In this embodiment, the paper discharge means uses a paper discharge roller which contacts the printed surface of a recording medium to discharge it out of the apparatus.

Figure 7A:
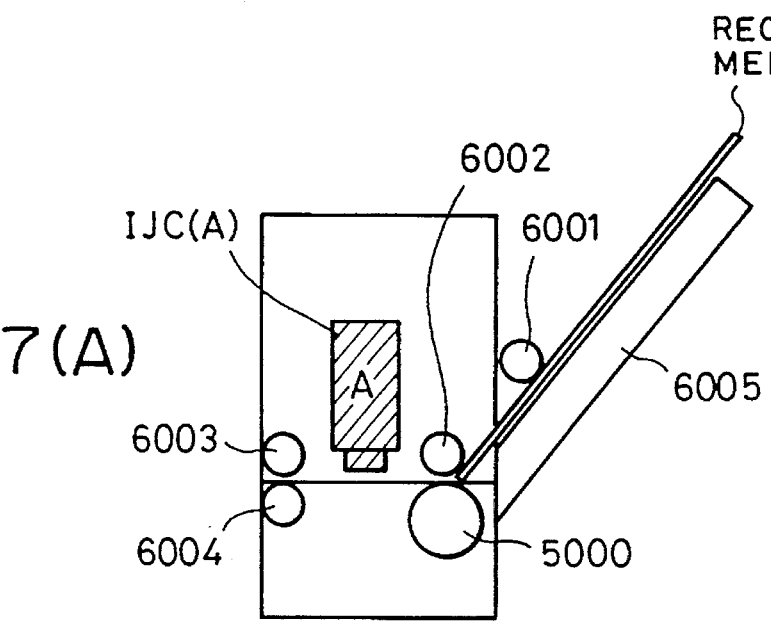
FIGS. 7(a) to 7(c) illustrate how the ink jet recording apparatus of the present invention is used.
Figure 7B:
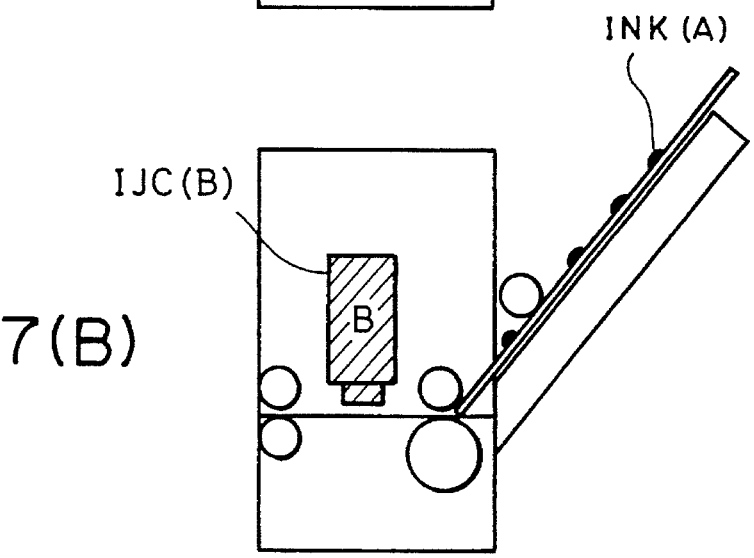
Figure 7C:
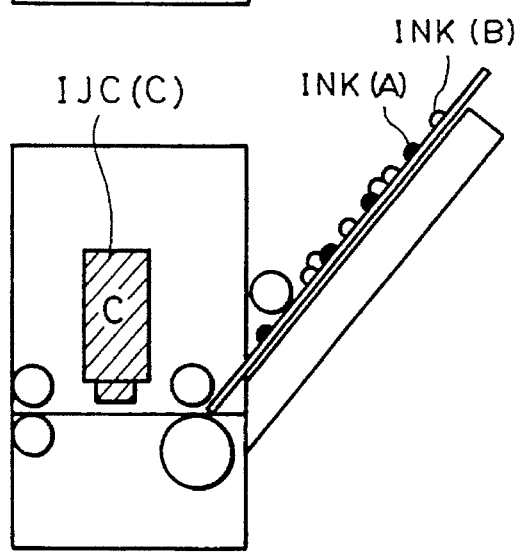

FIGS. 7 (a) to 7 (c) illustrate an example sequence of multi-process printing onto a single recording medium performed by the apparatus of the present invention. FIG. 7(a) illustrates the first printing process. The apparatus comprises an ink jet cartridge IJC (A) containing an ink (A); a sheet feeder 6005; a pick-up roller 6001; and a needle roller 6002 which is substantially parallel to the platen roller 5000 and pressed onto the platen roller 5000. The needle roller 6002 provides a driving force to convey a recording medium in the conveying direction. In a process shown in FIG. 7(b), a recording medium on which recording has been performed by the first printing process is set again in the sheet feeder 6005, and the ink jet cartridge IJC (A) is replaced by an IJC (B). Further, a paper discharge driving roller 6003 and a paper discharge roller 6004 are provided for discharging a recording medium out of the apparatus. As shown in the figure, the recording medium carries the ink (A) applied thereto by the first printing process. FIG. 7(c) illustrates a further process in which, after the second printing process, the recording medium is set in the sheet feeder 6005 again, and the IJC (B) is replaced by another IJC (C).

Because the mono-color multi-process printing uses one color ink for each printing process, this method substantially prevents print image defects, such as color mixture bleeding, boundary bleeding or the like, compared with a method employing a plurality of recording devices containing inks of different colors which are provided on a single carriage for performing color-recording substantially simultaneously. Therefore, this mono-color printing method only requires an ordinary type of paper, not a special type of paper, such as coated paper, in order to achieve high-quality printing. Because a period of at least several ten seconds is needed between one printing process and the subsequent process in order to replace the head, recording data and the like, the incidence of reverse ink transference from a recording medium to a sheet feeding system and the like is substantially eliminated. The sequence of printing processes is preferably changed in some cases, depending on colors, printing patterns, types of recording medium. For example, if patterns, such as characters, lines and the like, are to be printed with the background printed in a different color, that is, if there are any printing areas surrounded by a background color, the areas surrounded by the background color should be printed in the last printing process in order to achieve high-quality printing.

An optimal sequence of printing processes may be designated by extracting recording data on software, such as the printer driver. Further, in order to eliminate print image defects caused by printing position divergence or inconsistency in the amount of ink ejected, the recording method and apparatus of the present invention may employ a so-called fine mode method which uses different nozzles for different printing processes, or a method in which zigzag or reverse zigzag overlapping printing is performed as normally performed in color printing. Such methods may be performed by printing some of the recording patterns on a recording medium in the first printing process, and then printing the other patterns on the same recording medium in the second and/or later printing processes by using the same or a different head. The recording method and apparatus of the present invention may further employ an image enhancing method which changes the number of nozzles to be used and changes the recording medium registering positions for printing lines in accordance with the colors of inks to be used.

The mono-color multi-process printing method has advantages over an ordinary color ink jet recording method. Because the ordinary color ink jet recording method uses a plurality of recording heads arranged substantially in a line to apply different color inks to a recording medium in a single printing process, the sequence for applying the color inks to the recording medium is reversed every time the printing direction is reversed. The resulting image is liable to have different color tones corresponding to the printing directions, unless sophisticated color tone control is performed. On the other hand, the mono-color multi-process printing method is free from such drawbacks because the method achieves multicolor printing generally by printing patterns of one color in one process and patterns of another color in another process onto the same recording medium. Therefore, the mono-color multi-process printing method achieves consistent color tone without requiring color tone control, and substantially prevents bleeding, thus achieving significantly high-quality color printing.

As described above, the present invention provides a red ink, a green ink and a blue ink which achieve the following advantages:

(1) Orifice clogging is substantially prevented even after the recording head is left unused for a long time.
(2) A high-density image can be produced despite the low dye contents.
(3) Images of red, green and blue colors can be produced with high consistency and reproducibility regardless of the types of ordinary paper.
(4) Blur of a printed image can be substantially prevented even on an ordinary type of paper.

Thus, the inks of the present invention are particularly suitable for an ink jet recording method and apparatus in which thermal energy is applied to an ink to eject ink droplets from orifices to a recording medium.

While the present invention has been described with reference to what are presently considered to be the preferred embodiments, it is to be understood that the invention is not limited to the disclosed embodiments. To the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. An ink containing dyes and a liquid medium for dissolving or dispersing the dyes, said dyes including a first dye selected from the group consisting of C.I. Direct Blue #199 and C.I. Acid Blue #9 and a second dye selected from the group consisting of C.I. Acid Red #52 and the compounds represented by general formula (1):

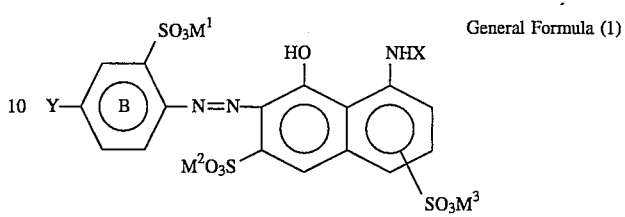

General Formula (1)

where Y is selected from the group consisting of a hydrogen atom, a methyl group, a methoxy group, an acetylamino group, and a nitro group, and Y may form a benzene ring together with the carbon atom at the 3 position of the benzene ring B; X is selected from the group consisting of an acetyl group, a benzoyl group, a p-toluenesulfonyl group, and 4-chloro-6-hydroxy- 1,3,5-triazine-2-yl group; and $M^1$, $M^2$ and $M^3$ are bases each selected from the group consisting of alkali metals and ammonium.; wherein the ratio by weight of the first dye to the second dye is within a range of 5:1 to 2:1.

2. An ink according to claim 1, wherein the concentration of said dyes in the ink is within a range of 1 to 2.5% by weight.

3. An ink according to claim 1, wherein said liquid medium includes water, urea, an aliphatic monoalcohol and a polyhydric alcohol having a high surface tension.

4. An ink containing dyes and a liquid medium for dissolving or dispersing the dyes, said dyes including a first dye selected from the group consisting of C. I. Direct Yellow #86 and C. I. Acid Yellow #23 and a second dye selected from the group consisting of C. I. Direct Blue #199 and C. I. Acid Blue #9.

5. An ink according to claim 4, wherein the ratio by weight of the first dye to the second dye is within a range of 1:4 to 1:1.5.

6. An ink according to claim 4, wherein the concentration of said dyes in the ink is within a range of 1 to 2.5% by weight.

7. An ink according to claim 4, wherein said liquid medium includes water, urea, an aliphatic monoalcohol and a polyhydric alcohol having a high surface tension.

8. An ink according to claim 3, wherein the polyhydric alcohol of said liquid medium includes glycerol and thiodiglycol.

9. An ink according to claim 7, wherein the polyhydric alcohol of said liquid medium includes glycerol and thiodiglycol.

10. An ink jet recording method for performing recording on a recording medium by ejecting a droplet of an ink from an orifice in response to a recording signal, wherein said ink includes an ink containing dyes and a liquid medium for dissolving or dispersing the dyes, said dyes including a first dye selected from the group consisting of C.I. Direct Blue #199 and C.I. Acid Blue #9 and a second dye selected from the group consisting of C.I. Acid Red #52 and the compounds represented by general formula (1):

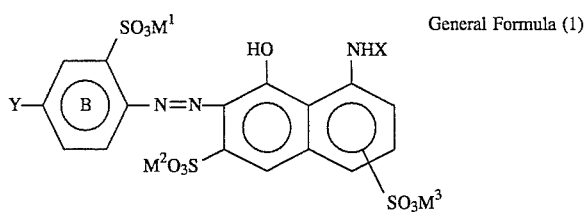

where Y is selected from the group consisting of a hydrogen atom, a methyl group, a methoxy group, an acetylamino group, and a nitro group, and Y may form a benzene ring together with the carbon atom at the 3 position of the benzene ring B; X is selected from the group consisting of an acetyl group, a benzoyl group, a p-toluenesulfonyl group, and 4-chloro-6-hydroxy- 1,3,5-triazine-2-yl group; and $M^1$, $M^2$ and $M^3$ are bases each selected from the group consisting of alkali metals and ammonium; wherein the ratio by weight of the first dye to the second dye is within a range of 5:1 to 2:1.

11. An ink jet recording method according to claim 10, wherein a droplet of said ink is ejected by applying thermal energy to the ink.

12. An ink jet recording method for performing recording on a recording medium by ejecting a droplet of an ink from an orifice in response to a recording signal, wherein said ink includes an ink containing dyes and a liquid medium for dissolving or dispersing the dyes, said dyes including a first dye selected from the group consisting of C. I. Direct Yellow #86 and C. I. Acid Yellow #23 and a second dye selected from the group consisting of C. I. Direct Blue #199 and C. I. Acid Blue #9.

13. An ink jet recording method according to claim 12, wherein a droplet of said ink is ejected by applying thermal energy to the ink.

14. A recording unit comprising an ink container for containing an ink, and a head portion for ejecting the ink as a droplet, wherein said ink includes an ink containing dyes and a liquid medium for dissolving or dispersing the dyes, said dyes including a first dye selected from the group consisting of C.I. Direct Blue #199 and C.I. Acid Blue #9 and a second dye selected from the group consisting of C.I. Acid Red #52 and the compounds represented by general formula (1):

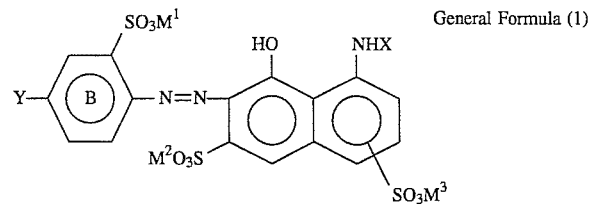

where Y is selected from the group consisting of a hydrogen atom, a methyl group, a methoxy group, an acetylamino group, and a nitro group, and Y may form a benzene ring together with the carbon atom at the 3 position of the benzene ring B; X is selected from the group consisting of an acetyl group, a benzoyl group, a p-toluenesulfonyl group, and 4-chloro-6-hydroxy- 1,3,5-triazine-2-yl group; and $M^1$, $M^2$ and $M^3$ are bases each selected from the group consisting of alkali metals and ammonium; wherein the ratio by weight of the first dye to the second dye is within a range of 5:1 to 2:1.

15. A recording unit according to claim 14, wherein said head portion includes a head for applying thermal energy to said ink to eject a droplet of said ink.

16. A recording unit comprising an ink container for containing an ink, and a head portion for ejecting the ink as a droplet, wherein said ink includes an ink containing dyes and a liquid medium for dissolving or dispersing the dyes, said dyes including a first dye selected from the group consisting of C. I. Direct Yellow #86 and C. I. Acid Yellow #23 and a second dye selected from the group consisting of C. I. Direct Blue #199 and C. I. Acid Blue #9.

17. A recording unit according to claim 16, wherein said head portion includes a head for applying thermal energy to said ink to eject a droplet of said ink.

18. An ink jet recording apparatus comprising a recording unit including an ink container for containing an ink, and a head portion for ejecting the ink as a droplet, wherein said ink includes an ink containing dyes and a liquid medium for dissolving or dispersing the dyes, said dyes including a first dye selected from the group consisting of C.I. Direct Blue #199 and C.I. Acid Blue #9 and a second dye selected from the group consisting of C.I. Acid Red #52 and the compounds represented by general formula (1):

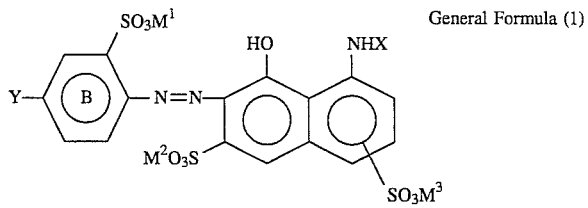

where Y is selected from the group consisting of a hydrogen atom, a methyl group, a methoxy group, an acetylamino group, and a nitro group, and Y may form a benzene ring together with the carbon atom at the 3 position of the benzene ring B; X is selected from the group consisting of an acetyl group, a benzoyl group, a p-toluenesulfonyl group, and 4-chloro-6-hydroxy- 1,3,5-triazine-2-yl group; and $M^1$, $M^2$ and $M^3$ are bases each selected from the group consisting of alkali metals and ammonium; wherein the ratio by weight of the first dye to the second dye is within a range of 5:1 to 2:1.

19. An ink jet recording apparatus according to claim 18, wherein said heard portion includes a head for applying thermal energy to said ink to eject a droplet of said ink.

20. An ink jet recording apparatus comprising a recording unit including an ink container for containing an ink, and a head portion for ejecting the ink as a droplet, wherein said ink includes an ink containing dyes and a liquid medium for dissolving or dispersing the dyes, said dyes including a first dye selected from the group consisting of C. I. Direct Yellow #86 and C. I. Acid Yellow #23 and a second dye selected from the group consisting of C. I. Direct Blue #199 and C. I. Acid Blue #9.

21. An ink jet recording apparatus according to claim 20, wherein said head portion includes a head for applying thermal energy to said ink to eject a droplet of said ink.

22. An ink according to claim 1, wherein the ink is suitable for an ink jet recording method which uses thermal energy to produce ink droplets.

23. An ink according to claim 4 wherein the ink is suitable for an ink jet recording method which uses thermal energy to produce ink droplets.

\* \* \* \* \*

UNITED STATES PATENT AND TRADEMARK OFFICE
CERTIFICATE OF CORRECTION

PATENT NO. : 5,476,541
DATED : December 19, 1995
INVENTOR(S) : Shinichi TOCHIHARA It is certified that error appears in the above-indentified patent and that said Letters Patent is hereby corrected as shown below:

COLUMN 3:

Line 41, "M1, M2 and M3" should read --$M^1$, $M^2$ and $M^3$--;
　　　　Line 43, "ammonium. Although" should read --ammonium. ¶ Although--.

COLUMN 6:

Line 14, "invention. Here" should read --invention. ¶ Here--.

COLUMN 8:

Line 14, "jet" should read --Jet--;
　　　　Line 50, "jet" should read --Jet--.

COLUMN 12:

Line 38, "jet" should read --Jet--.

UNITED STATES PATENT AND TRADEMARK OFFICE
CERTIFICATE OF CORRECTION

PATENT NO. : 5,476,541
DATED : December 19, 1995
INVENTOR(S) : Shinichi TOCHIHARA It is certified that error appears in the above-indentified patent and that said Letters Patent is hereby corrected as shown below:

COLUMN 18:

Line 44, "heard" should read --head--;
Line 61, "claim 4" should read --claim 4,--.

Signed and Sealed this

Thirtieth Day of April, 1996

BRUCE LEHMAN

Attest:

Attesting Officer

Commissioner of Patents and Trademarks